Patented Mar. 16, 1937

2,073,685

UNITED STATES PATENT OFFICE 2,073,685

MANUFACTURE OF FATTY ACID ANHYDRIDES

Henry Dreyfus, London, England

No Drawing. Application May 4, 1932, Serial No. 609,251. In Great Britain July 15, 1931

9 Claims. (Cl. 260—123)

This invention relates to the manufacture of fatty acid anhydrides, and especially acetic anhydride.

According to the present invention I have found that acetates of metals of high or relatively high basicity may be treated to yield anhydride provided they are heated in admixture or association with the more acidic salts, such as salts of strong mineral acids. More particularly I have found that when acetates of the alkaline earth metals, of iron, lead, manganese, aluminium, zinc and like metals whose acetates normally yield substantial quantities of acetone or gaseous decomposition products on heating, are heated in admixture with the more acidic salts, acetic anhydride can be produced in a very satisfactory manner. The more acidic salts may conveniently consist of or comprise the sulphate, chloride or the like of the metal present in the particular acetate. Preferably I employ the mixtures of the acid salts and acetates containing the components in very uniform admixture. The amount of acid salt relatively to the acetate may vary somewhat with the particular acetate and acid salt, the more basic the metal of the particular acetate the higher being the quantity of acid salt. In general quantities upwards of about 5%, e. g. from about 5% to 75% of acid salts may very usefully be employed with acetates of such metals as zinc, lead, iron, aluminium or manganese, whilst larger quantities such for instance as 25 to 100% or more relatively to the acetate may usefully be employed with acetates of alkaline earth metals. It is to be understood, however, that the invention is not limited with respect to the relative proportions of acetates and acid salts.

To conserve the highest possible yields of anhydride and avoid loss of anhydride through hydrolysis to acetic acid, the acetates should be employed in anhydrous form, i. e. free, or substantially free from water of crystallization, or the water should be removed as completely as possible before subjecting the acetates to the decomposition of the invention. Likewise the acid salts should be employed in anhydrous form, particularly if the acetates to be decomposed in admixture therewith are not in anhydrous form. Preferably both the acetates and the acid salts are employed in the anhydrous form. Where necessary the substances to be employed for the decomposition may be subjected to any convenient process for removal of water prior to the decomposition. Thus, for instance, such removal may be effected by heating, preferably over sulphuric acid or in a current of gas or vapour or under reduced pressure. For such heating excessive temperatures liable to cause decomposition of the acetate should be avoided. For this reason I preferably employ temperatures below about 200° C. and especially temperatures not substantially exceeding 150° C. In cases where it is desired or necessary to remove water from the acid salt, such removal may often with advantage be effected prior to admixture with the acetate, since for substantial dehydration of a large number of acid salts temperatures are requisite that are liable to cause premature decomposition of the acetate.

I preferably employ the acetates in the form of the normal salts as distinct from the basic acetates. As above indicated, the acetates are employed in the form of mixtures of the acetates with more acidic salts.

The decomposition of the mixtures of the acetates with the more acidic salts can be effected in any convenient way. For instance, the said mixtures may be simply heated, or for instance they may be heated in a current of air, nitrogen, carbon dioxide or other indifferent gas or in a current of an indifferent vapour, such for instance as benzol or petroleum ether. The heating may be performed at any temperature sufficient to decompose the acetate, temperatures of between about 200° C. and 450° C. and particularly between about 250° C. and 350° C., being especially suitable for this purpose. Excessive temperatures liable to cause destruction of the anhydride should, of course, be avoided, especially in cases where the decomposition is performed in absence of a stream or current of gas or vapour.

The decomposition may be performed at ordinary atmospheric pressure or under increased pressure or under decreased pressure or "vacuum". Usually it is preferable to employ reduced pressure, but in cases where a volatile acetate such as zinc is employed increased pressure is highly useful.

If instead of the acetates there are employed the salts of higher fatty acids, such for instance as the propionates or butyrates or of substituted fatty acids such as methoxy acetic acid, the corresponding higher fatty acid anhydrides or substituted fatty acid anhydrides can readily be obtained by means of the invention.

The following example serves to illustrate a convenient form of execution of the invention, it being understood that it is given solely by way of illustration and is in no way limitative.

*Example*

Crystalline manganous acetate is heated to about 120° C. until water removal at that temperature is substantially complete. The dried acetate is then mixed with about one half of its weight of anhydrous manganous chloride. The mixture is then subjected to decomposition at a temperature of about 280 to 300° C. under an absolute pressure of about 10 to 20 mm. The vapors resulting from the decomposition are subjected to condensation. If desired the crude anhydride so obtained may be subjected to fractional destillation to obtain it in as pure a form as possible.

What I claim and desire to secure by Letters Patent is:—

1. Process for the manufacture of fatty acid anhydrides, which comprises thermally decomposing fatty acid salts of metals whose acetates, on heating, normally yield acetone or gaseous products, in association with salts selected from the group consisting of normal sulphates and normal chlorides of the same metals.

2. Process for the manufacture of acetic anhydride, which comprises thermally decomposing a metal acetate which, on heating, normally yields acetone or gaseous products, in association with a salt selected from the group consisting of the normal sulphate and normal chloride of the same metal.

3. Process for the manufacture of acetic anhydride, which comprises heating to a temperature of 200–450° C. a mixture of an alkaline earth metal acetate and a salt selected from the group consisting of the normal sulphate and normal chloride of the alkaline earth metal.

4. Process for the manufacture of acetic anhydride, which comprises heating to a temperature of 250–350° C. a mixture of between 80% and 50% of an alkaline earth metal acetate and between 20% and 50% of a salt selected from the group consisting of the normal sulphate and normal chloride of the alkaline earth metal.

5. Process for the manufacture of acetic anhydride, which comprises heating to a temperature of 200–450° C. a mixture consisting of lead acetate and a salt selected from the group consisting of the normal lead salts of sulphuric and hydrochloric acids.

6. Process for the manufacture of acetic anhydride, which comprises heating to a temperature of 200–450° C. a mixture of between 95% and 60% of lead acetate and between 5% and 40% of a salt selected from the group consisting of the normal lead salts of sulphuric and hydrochloric acids.

7. Process for the manufacture of acetic anhydride, which comprises heating to a temperature of 200–450° C. a mixture consisting of manganous acetate and a salt selected from the group consisting of the normal manganous salts of sulphuric and hydrochloric acids.

8. Process for the manufacture of acetic anhydride, which comprises heating to a temperature of 200–450° C. a mixture of between 95% and 60% of manganous acetate and between 5% and 40% of a salt selected from the group consisting of the normal manganous salts of sulphuric and hydrochloric acids.

9. Process for the manufacture of acetic anhydride, which comprises heating to a temperature between 280 and 300° C. under pressure between 10 and 20 millimetres a mixture consisting of two parts of anhydrous manganous acetate and one part of anhydrous manganous chloride.

HENRY DREYFUS.